(12) United States Patent
Jacquelin et al.

(10) Patent No.: US 9,510,013 B2
(45) Date of Patent: Nov. 29, 2016

(54) ESTIMATION OF THE MOVEMENT OF AN IMAGE

(71) Applicant: SAGEM DEFENSE SECURITE, Boulogne-Billancourt (FR)

(72) Inventors: Frédéric Jacquelin, Boulogne-Billancourt (FR); Joël Budin, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 14/760,414

(22) PCT Filed: Jan. 10, 2014

(86) PCT No.: PCT/FR2014/050049
§ 371 (c)(1),
(2) Date: Jul. 10, 2015

(87) PCT Pub. No.: WO2014/108652
PCT Pub. Date: Jul. 17, 2014

(65) Prior Publication Data
US 2015/0358637 A1 Dec. 10, 2015

(30) Foreign Application Priority Data
Jan. 11, 2013 (FR) .................................. 13 50271

(51) Int. Cl.
*G06T 7/20* (2006.01)
*H04N 19/513* (2014.01)
(Continued)

(52) U.S. Cl.
CPC ............ *H04N 19/513* (2014.11); *G06T 7/208* (2013.01); *G06T 7/2053* (2013.01); *G06T 7/2066* (2013.01); *H04N 5/145* (2013.01); *H04N 19/43* (2014.11); *G06T 2207/10016* (2013.01)

(58) Field of Classification Search
None
See application file for complete search history.

(56) References Cited

U.S. PATENT DOCUMENTS

| 5,089,887 A * | 2/1992 | Robert ................. G06T 7/2066 348/699 |
| 2011/0043706 A1 | 2/2011 | Van Beek et al. |

FOREIGN PATENT DOCUMENTS

| EP | 0 360 698 A1 | 3/1990 |
| WO | WO 2008/099399 A2 | 8/2008 |

OTHER PUBLICATIONS

PCT International Search Report and Written Opinion for PCT/FR2014/050049, mailed Apr. 4, 2014, 12 pgs.
(Continued)

*Primary Examiner* — Delomia L Gilliard
(74) *Attorney, Agent, or Firm* — Patterson Thuente Pedersen, P.A.

(57) ABSTRACT

A method for estimation of motion in a series of images captured by an image sensor comprising an estimation of motion vectors at a plurality of points from an image by an operation, done at each of the points from the plurality of points, of minimization of a functional of motion vectors comprising the sum of a data term and a regulation term, where the data term is made up of the product of a weighting term which is a function of the degree of regularity of the estimated motion vectors and a data linkage term which is a function of the spatial-temporal gradients of the brightness near points located in a neighborhood of a point, where the regulation term supplies a result to the minimization operation for the points near which the minimization of the data term does not allow estimating a unique solution.

11 Claims, 4 Drawing Sheets

(51) Int. Cl.
*H04N 5/14* (2006.01)
*H04N 19/43* (2014.01)

(56) References Cited

OTHER PUBLICATIONS

English translation of PCT International Search Report for PCT/FR201/050049, mailed Apr. 4, 2014, 3 pages.

Black M J et al: "The Robust Estimation of Multiple Motions: Parametric and Piecewise-Smooth Flow Fields". Computer Vision and Image Understanding, Academic Press, US, vol. 63, No. 1, Jan. 1, 1996, pp. 75-104, XP000582617, ISSN: 1077-3142, DOI: 10.1006/CVIU.1996.0006 4. Robust Estimation, 6. Robust Regularization Experiments.

S. S. Beauchemin et al: "The computation of optical flow", ACM Computing Surveys, vol. 27, No. 3, Sep. 1, 1995, pp. 433-466, XP055079144, ISSN: 0360-0300, DOI: 10.1145/212094.212141.

Berthold K. P. Horn and Brian G. Schunck, "Determining Optical Flow", Artificial Intelligence, 1981, pp. 185-203.

Andrés Bruhn and Joachim Weickert,"Lucas/Kanade Meets Horn/Schunck: Combining Local and Global Optic Flow Methods", International Journal of Computer Vision 61(3), 211-231, 2005.

Bruce David Lucas, "Generalized Image Matching by the Method of Differences", Carnegie Mellon University, Pittsburgh, Pennsylvania, Jul. 1984, 167 pgs.

\* cited by examiner

ESTIMATION OF THE MOVEMENT OF AN IMAGE

RELATED APPLICATIONS

The present application is a National Phase entry of PCT Application No. PCT/FR2014/050049, filed Jan. 10, 2014, which claims priority from FR Patent Application No. 13 50271, filed Jan. 11, 2013, said applications being hereby incorporated by reference herein in their entirety.

FIELD OF THE INVENTION

The invention relates to the field of image processing and more specifically to the field of estimating motion within a sequence of captured images.

BACKGROUND OF THE INVENTION

When a sensor captures a sequence of successive images, for example in the case of a video, it is known to make an estimate of global inter-image motion. This motion estimate seeks to determine the global motion affecting the image sequence between successive image pairs from the sequence and can correspond to the determination of the motion of the viewing axis of the sensor used.

With such an global motion estimate, image stabilization, image noise removal or even super-resolution algorithms in particular can be implemented.

However, this type of processing can be substantially disrupted when the captured scene comprises objects which are moving within the scene during the image sequence in question.

Image processing systems are then based on implementing a dense but no longer global motion estimate, still called "local motion estimate".

A dense motion estimate consists of estimating the motion of each point P(x, y), or pixel, of the images from the captured sequence. More specifically, a displacement field $\vec{d}(x, y)$ is defined based on two images and corresponds to the vectors to be applied respectively to each point of the first image in order to be able to obtain the corresponding point from the second image.

Other than the displacement field $\vec{d}(x, y)$, the velocity field $\vec{v}(x, y)$ can be interesting. This velocity field is also called optical flow and is formed by the set of velocity vectors at a given moment for each point of the image. This velocity field is a function of the derivative of the displacement field with respect to a fixed reference.

The dense motion estimation methods are thus based on the assumption of luminance conservation for each point of the scene which is expressed by the apparent motion constraint equation:

$$I(x,y,t) = I(x+dx, y+dy, t+dt) \quad (1)$$

where the images from the image series are provided with a reference frame (O, x, y) and axes OX and Oy with which to reference the points P(x, y) from said images. I(x,y,t) is a light intensity value (hereafter called "brightness") at a point P(x,y) from the scene at a moment of capture t of an image called preceding image $I_{k-1}$. An image called following image $I_k$ is captured at an instant t+dt, and dt then corresponds to the interval of time between the two images $I_{k-1}$, $I_k$. Finally, (dx, dy)=$\vec{d}(x, y)$ designates the displacement vector of the point P(x,y) between the instants t and t+dt.

In order to determine the velocity field $$\vec{v} = (v_x, v_y) = \left(\frac{dx}{dt}, \frac{dy}{dt}\right),$$

also called velocity vector field or motion field, it is possible to expand the above equation just to the first-order.

$$I(x, y, t) = I(x, y, t) + \left[\frac{\partial I}{\partial x}dx + \frac{\partial I}{\partial y}dy + \frac{\partial I}{\partial t}dt\right] \quad (2)$$

Equation (2) can be written as follows:

$$\frac{\partial I}{\partial x}dx + \frac{\partial I}{\partial y}dy + \frac{\partial I}{\partial t}dt = 0 \quad (3)$$

Finally, equation (3) can be written as follows:

$$\frac{\partial I}{\partial x}v_x + \frac{\partial I}{\partial y}v_y + \frac{\partial I}{\partial t} = 0 \quad (4)$$

In order to estimate the motion vector at a point P(x, y), this equation (3) then needs to be solved. This equation alone is not however sufficient to determine the motion: it is what is called a poorly stated problem.

In order to get around this difficulty, setting some additional constraints on the desired solution, for example assumptions of local smoothness of the velocity field, is appropriate and various methods are known for moving ahead with this estimation, such as, for example the Horn-Schunck method and the Lucas-Kanade method.

These methods however have disadvantages.

The Horn-Schunck method requires an assumption of smoothness of the velocity field which limits its effectiveness in the presence of discontinuities of the velocity field. Additionally, it is solved by gradient descent and is consequently slow.

The Lucas-Kanade method assumes the velocity field is locally constant. It is robust in the presence of noise, but it has the disadvantage of being sparse, meaning that it is not able to estimate the velocity field in the area of points in whose neighborhood the vector spatial-gradient of the brightness is locally uniform.

"Locally uniform" is understood to mean that the vector spatial-gradients of the brightness near different points from the neighborhood under consideration are either substantially parallel with each other, or substantially zero. Substantially zero is understood to mean that a vector spatial-gradient of brightness considered is less than the image noise.

In the following, (brightness) spatial-gradient is understood to mean any one of the scalar components $$\left(\text{for example } \frac{\partial I}{\partial x} \text{ or } \frac{\partial I}{\partial y}\right)$$

of the (brightness) vector spatial-gradient, which is a vector.

Also the expressions "brightness vector spatial-gradient" and "vector spatial-gradient of brightness" will be used interchangeably.

In the following, (brightness) gradient is understood to mean any one of the scalar components $$\left(\text{for example } \frac{\partial I}{\partial x}, \frac{\partial I}{\partial y} \text{ or } \frac{\partial I}{\partial t}\right)$$

of the (brightness) vector spatial-temporal gradient, which is a vector.

It is possible to combine the Horn-Schunck method and the Lucas-Kanade method, as is for example detailed in the article "Lucas/Kanade Meets Horn/Schunck: Combining Local and Global Optic Flow Methods" by A. Brunh, J. Weickert and C. Schnörr. This method however also has disadvantages such as the calculation cost related to the iterative resolution method used in this method or the set weighting of a term called data linkage term which does not consider the degree of smoothness of the calculated displacement field.

The purpose of the invention is to improve the situation.

SUMMARY OF THE INVENTION

A first aspect of the invention proposes a method for estimation of motion in a series of images captured by an image sensor where said series of images comprises at least one preceding image $I_{k-1}$ and one following image $I_k$ and the images comprise points with which are associated brightness data.

The method comprises the step of estimating the estimated motion vectors V, done at a plurality of image points chosen among the list made up by the previous image $I_{k-1}$ and the following image $I_k$.

The estimation step includes, for each of the points P of said plurality of points of an image, an operation of minimization of a functional J of motion vectors V.

The functional J comprises a sum of at least one term referred to as data term and one term referred to as regulation term.

The data term is a function of spatial-temporal gradients of brightness data associated with a plurality of points from a neighborhood $\Omega_P$ of a point P. According to an embodiment, the data term is a function of the vector spatial-temporal gradients of associated brightness data (meaning of each of their scalar components).

The regulation term has at least one finite value for each of the points P of said plurality of points of an image in the area of which the minimization of the data term provides an irregular solution.

A solution is irregular if the minimization of the data linkage term does not allow estimating a unique solution.

The data term comprises a product of a term referred to as weighting term and a term referred to as data linkage term, where the weighting term is a function of the degree of regularity of the estimated motion vectors V, where the data linkage term is a function of spatial-temporal gradients of brightness data associated with a plurality of points from a neighborhood $\Omega_P$ of a point P. According to an embodiment, the data linkage term is a function of the vector spatial-temporal gradients of associated brightness data (meaning of each of their scalar components).

Here, the terms "previous image" and "following image" from a series of captured images mean two successive chronological images in the series of images being considered. These two successive images could be consecutive (meaning that they are not separated by any intermediate captured image) or else could be separated from each other by one or more intermediate captured images. No limitation is attached to the spacing between the preceding image and the following image considered here.

The term "estimation of estimated motion vectors" mean an estimation process with which to provide estimated motion vectors for each part of the image, with greater or lesser precision. An image motion can thus be estimated for each point of the image, for example. With this type of motion estimation, the motion of mobile objects, which could traverse the images in the series of captured images, can in particular be represented. Among the conventional methods presented in the literature, the person skilled in the art in particular knows the Lucas-Kanade method and the Horn-Schunck method.

A first method consists of a least-squares solution of the equation of apparent motion over a local window. The second method, taken from the article by Berthold K. P. Horn and Brian G. Schunck, "Determining Optical Flow" (Artificial Intelligence, 1981), consists of a minimization of a functional comprising a data linkage term including the square the equation of apparent motion and the regularization term comprising the square of the local variation of the field.

"The data" is understood to mean all the brightness data from the points of one image.

The "data term" and the "data linkage term" are terms which are a function of the spatial-temporal gradients of the brightness in the area of the points located in a neighborhood $\Omega_0$ of one point $P_0(x_0, y_0)$.

The extent of this neighborhood $\Omega_0$, for example the maximum distance between points included in this neighborhood relative to the point $P_0$, and also a weighting of each of these points in a data linkage term calculation can be variables according to the conditions of use of the method.

A regulation term is understood to mean a term having a finite value at least at one of the points $P_0$ of the image near which the minimization of the data term provides an irregular solution.

The minimization of the data term provides for example an irregular solution in homogeneous regions and regions of low angular diversity. Homogeneous regions are regions of substantially constant brightness and therefore regions in which the magnitudes of the vector spatial gradients of brightness are substantially zero (below a set threshold which could correspond to a noise level). In a region of low angular diversity, the associated vector spatial gradients of brightness at different points in the region are substantially parallel.

The angular diversity is measured for example by the variance of the set of angles defined respectively by a pair of gradients over all the pairs of possible gradients selected in the set of all the gradients considered.

A region of low angular diversity is a region in which the angular diversity of the vector spatial-gradients of brightness associated with different points from the region is substantially zero (below a set threshold which could correspond to a noise level).

A finite value of a term (for example a regulation term) is a unique and non-infinite, real or imaginary value. Such a finite value can be defined in advance of an estimation step or calculable by means of a regular function defined over an interval comprising a point $P_0$. A regulation term therefore serves to smooth a motion vector field by providing a solution to the problem consisting of minimizing a functional in the area of the points from an image where the minimization of a data linkage term is not able to estimate a unique solution.

Weighting term is understood to mean a term with which to weight the relative importance of data linkage terms and regulation terms, where the weighting is done as a function of the spatial-gradient of the brightness data in a neighborhood of a point $P_0$. According to an embodiment, the weighting is done as a function of the vector spatial-gradient of the brightness data in the neighborhood of a point $P_0$.

Degree of regularity of estimated motion vector is understood to mean a function of the variance of the estimated motion vector field.

In possible embodiments of the invention, one or another of the following arrangements could additionally be used:
  The minimization operation is reiterated at least once;
  During an iteration n+1 of the minimization operation, the regulation term comprises an estimated motion vector function V resulting from the previous iteration n;
  During an iteration n+1 of the minimization operation, the weighting term comprises a function of a local variance of estimated motion vector function V resulting from the previous iteration n;
  The operation of minimization of the functional comprises a least-squares minimization;
  The method additionally includes a step of scaling images from the image series, where said step of scaling is done prior to the step of estimated motion vector V estimation;
  The scaling step and the estimation step are iterated for at least two different image scales of the image series;
  The process additionally includes a step of registering the following image $I_k$, done after the scaling step and before the minimization step, where the registration step comprises, for an iteration n+1 of said scaling, registration and estimation steps, the registering of the following image $I_k$ over the base of estimated motion vectors resulting from the preceding iteration;
  The estimated motion vectors V resulting from an iteration are stored if they satisfy an estimation reliability criterion and replaced by a function of the estimated motion vectors V resulting from the preceding iteration if they do not satisfy said criterion.

The subject of the invention is also a system for processing a series of images captured by an image sensor, where said series of images comprises at least one preceding image $I_{k-1}$ and one following image $I_k$, where the images each comprise points with which are associated brightness data;

The system comprises an estimation circuit suited for estimating the estimated motion vectors V at a plurality of points from an image selected among the list made up by the preceding image $I_{k-1}$ and the following image $I_k$;

Said estimation comprises, for each of the points P of said plurality of points of an image, an operation of minimization of a functional J of motion vectors V;

The functional J comprises a sum of at least one data term and one regulation term;

The data term is a function of spatial-temporal gradients of brightness data associated with a plurality of points from a neighborhood $\Omega_P$ of a point P;

The regulation term has at least one finite value for each of the points P of said plurality of points of an image in the area of which the minimization of the data term provides an irregular solution;

The data term comprises a product of a weighting term and a data linkage term,

The weighting term is a function of the degree of regularity of the estimated motion vectors V, where the data linkage term is a function of spatial-temporal gradients of brightness data associated with a plurality of points from a neighborhood $\Omega_P$ of a point P.

The subject of the invention is also a computer program comprising instructions suited for implementing a method as described above during execution of this program by circuit from a system for processing a series of images captured by an image sensor.

Finally the subject to the invention is a medium for nonvolatile recording on which a computer program as described above is stored.

BRIEF DESCRIPTION OF THE DRAWINGS

Other features and advantages of the invention will also appear upon reading the following description. This is purely illustrative and must be read in light of the attached drawings on which.

DETAILED DESCRIPTION OF THE DRAWINGS

Similarly to the Lucas-Kanade method described in the thesis of Bruce D Lucas done at Carnegie Mellon University and published in 1984 under the title "Generalized Image Matching by the Method of Differences", the velocity field can be assumed to be locally constant over a neighborhood $\Omega_0$ of each point $P_0(x_0, y_0)$.

It is then possible to solve the equation (4) by a least-squares minimization method, in order to determine a value of the velocity field $\vec{w}$ which minimizes the following functional H:

$$H(v_x, v_y) = \sum_{(x,y)\in\Omega_0} W(x-x_0, y-y_0)\left[\frac{\partial I}{\partial x}(x, y)v_x(x_0, y_0) + \left[\frac{\partial I}{\partial y}(x, y)v_y(x_0, y_0) + \frac{\partial I}{\partial t}\right]^2\right] \quad (5)$$

With the window function W, a weighting can be done over the set of points from the neighborhood $\Omega$ of the point $P_0(x_0, y_0)$. The function can be such that $\Sigma W=1$, for example $W=[1\ 2\ 1]^T[1\ 2\ 1]/4^2$.

Solving the least-squares system from equation (5) requires inverting a 2×2 matrix. This inversion is only possible around points having a sufficiently high angular diversity of spatial-gradients of brightness, as indicated above, for example points in the neighborhood of which there exist at least two points for which the vector spatial-gradients of light intensity have substantially distinct directions.

Figure 1:
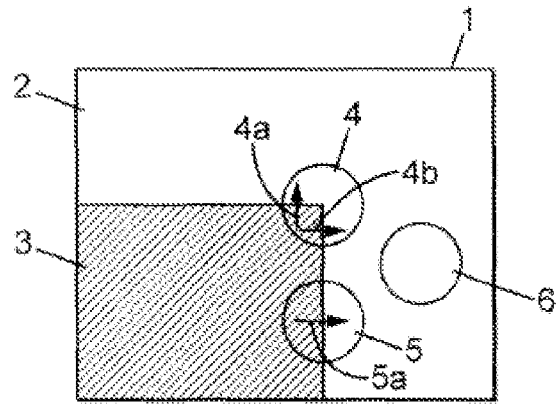
FIG. 1 shows the main steps of a motion estimation method according to an embodiment of the present invention.

Thus, with reference to FIG. 1, one image 1 can for example be formed from a homogeneous light region 2 and also a homogeneous dark region 3 with overall rectangular shape.

The first neighborhood 4, which has, for example, the general shape of a disk centered on one of the summits of the dark homogeneous region 3, will therefore include vector spatial-gradients of brightness along two different directions 4a and 4b, which are for example along the horizontal direction and the vertical direction. A displacement of the dark homogeneous region 3 could then be completely determined in this neighborhood.

A second neighborhood 5, which has a shape similar to the first neighborhood 4 and is located for example in the area of one of the vertical edges of the dark homogeneous region 3, only has a vector spatial-gradients of brightness along one direction 5a, for example the horizontal direction. The displacement of the dark homogeneous region 3 can therefore not be completely determined.

Finally, a third neighborhood 6, which also has a shape similar to the first neighborhood 4, is for example entirely located in the light homogeneous region 2. In this neighborhood 6, the vector spatial-gradient to the brightness is essentially zero and estimation of the displacement field is therefore impossible.

Thus there exist two types of regions in which the estimation of the velocity field by a Lucas-Kanade method is not possible:

Regions in which the light intensity is homogeneous (small spatial-gradient of the brightness along all directions) and in which it is therefore not possible to estimate the velocity field, and Regions in which the light intensity only varies along one direction (spatial vector gradients of the brightness substantially oriented along a single direction for all the points in the region), for example one-dimensional edges, regions in which only one component of the velocity field can be reliably estimated.

To find a minimization at every point, it is advantageous to minimize the following functional J at each point $P_0(x_0, y_0)$ of the image:

$$J(v_x, v_y)(x_0, y_0) = \phi(v_x, v_y) \left[ \sum_{(x,y) \in \Omega_0} W(x - x_0, y - y_0) \left( \frac{\partial I}{\partial x}(x, y) v_x(x_0, y_0) + \frac{\partial I}{\partial y}(x, y) v_y(x_0, y_0) + \frac{\partial I}{\partial t} \right)^2 \right] + \lambda^2 ((v_x - \bar{v}_x)^2 + (v_y - \bar{v}_y)^2) \quad (6)$$

This functional has three terms: a data linkage term, a term for weighting as a function of the degree of regularity of the estimated field and a regulation term; they are now going to be detailed.

The functional is made up of the product of the weighting term and the data linkage term, to which is added the regulation term.

The term $$\sum_{(x,y) \in \Omega_0} W(x - x_0, y - y_0) \left( \frac{\partial I}{\partial x}(x, y) v_x(x_0, y_0) + \frac{\partial I}{\partial y}(x, y) v_y(x_0, y_0) + \frac{\partial I}{\partial t} \right)^2$$

from the preceding equation (6) is a data linkage term which reflects the local constancy of the velocity field in the neighborhood $\Omega_0$ of the point $P_0(x_0, y_0)$, in a manner similar to the functional H from equation (5) above. The minimization of this term serves to estimate a velocity field as a function of the spatial-temporal gradients of the light intensity.

The term $\phi(v_x, v_y)$ from the previous equation (6) is a weighting term which is a function of the degree of regularity of the field estimated from the data linkage term. This term is used to reduce the significance of the data linkage term in homogeneous and one-dimensional regions.

As detailed above, in homogeneous and one-dimensional regions, the estimation of the velocity field provided by the data linkage term is irregular and must be used with caution.

As an example, a function of the form $\phi(\text{var}(v_x, v_y))$ could be used for the term $\phi(v_x, v_y)$, where the function $\phi$ is a decreasing function with a value between 0 and 1 and where $\text{var}(v_x, v_y)$ is the variance of the velocity field at the point $P_0(x_0, y_0)$ or in the neighborhood of the point $P_0(x_0, y_0)$. Thus, when the estimation of the velocity field is irregular, the variance $\text{var}(v_x, v_y)$ is high and the weighting term is near 0. On the other hand, if the estimation is regular, the variance is low and the weighting term will be near 1. In the case where a neighborhood of the point $P_0(x_0, y_0)$ is considered, a weighting term $\phi(\bar{v}_x, \bar{v}_y)$ could be used, where $\bar{v}_x$ and $\bar{v}_y$ are averages of the velocity field in the neighborhood of the point $P_0(x_0, y_0)$.

As an example, $\phi: x \mapsto 1/(1+(x/0.02)^2)$, which is a decreasing function with values between 0 in 1, could be used.

Other forms of the weighting term could be used as long as they provide a small value term in regions where the estimation provided by the data linkage term is unreliable.

The weighting term can in particular comprise a weighting term for homogeneous regions, for example with the form $\psi(\lambda_+/g)$ where $\psi$ is a positive increasing function over $[0, \infty[$, where $\lambda_+$ is a function of the spatial-temporal gradients of the brightness (for example the upper eigenvalue of the matrix of gradients P which is detailed later) and where g is a weighting threshold value. As an example, a function $\psi$ of the form could be used $\psi: x \mapsto 1/(1+(0.2/x)^2)$.

The term $\lambda^2((v_x - \bar{v}_x)^2 + (v_y - \bar{v}_y)^2)$ from the previous equation (6) is a regulation term. The average values $\bar{v}_x$ and $\bar{v}_y$ correspond to the average values the components of the velocity field over the neighborhood of the point $P_0(x_0, y_0)$, taken respectively along the Ox axis and the axis Oy.

The regulation term serves to replace the estimation of the velocity field provided by the data linkage term with the average value of said field over a neighborhood of the point $P_0(x_0, y_0)$.

Because of the weighting term detailed above, this replacement is done only in the area of the points for which said estimation is irregular as a result of either an absence of gradient (meaning substantially zero gradients) or vector spatial-gradients that are substantially parallel.

Other forms of the regulation term could be used so as to provide a term serving to give a value of the velocity field consistent with the estimated values the velocity field in the neighborhood of the point $P_0(x_0, y_0)$.

As an example, the average values of the velocity field could be given by application of a fifth-order pyramidal filter F to the velocity field: $\overline{V}_n = V_n * F$ with for example:

$$F = \frac{1}{3^4}[1 \ 1 \ 1] * [1 \ 1 \ 1] * \begin{bmatrix}1\\1\\1\end{bmatrix} * \begin{bmatrix}1\\1\\1\end{bmatrix} \quad (11)$$

The system is solved iteratively for each point $P_0(x_0, y_0)$ from the image, in order to obtain an estimate V of the velocity field $V = \lim_{n \to +\infty} V_n$.

On each iteration n, the functional for the least-squares J at the point $P_0(x_0, y_0)$ from equation (6) is minimized by a matrix method. This method consists of casting the functional J in matrix form before taking its derivative and canceling this derivative in order to obtain a solution for the velocity field for iteration n: $V_n$.

Taking the derivative and canceling the derivative lead to solving the following equation:

$$\begin{bmatrix} \phi(v_{x,n}, v_{y,n}) \begin{bmatrix} W(r_1)I_x(r_1) & W(r_1)I_y(r_1) \\ \cdots & \cdots \\ W(r_n)I_x(r_n) & W(r_n)I_y(r_n) \end{bmatrix} \\ \lambda \begin{bmatrix} 1 & 0 \\ 0 & 1 \end{bmatrix} \end{bmatrix} \begin{bmatrix} v_{x,n+1} \\ v_{y,n+1} \end{bmatrix} = \begin{bmatrix} \phi(v_{x,n}, v_{y,n}) \begin{bmatrix} -W(r_1)I_t(r_1) \\ \cdots \\ -W(r_n)I_t(r_n) \end{bmatrix} \\ \lambda \begin{bmatrix} \overline{v}_{x,n} \\ \overline{v}_{y,n} \end{bmatrix} \end{bmatrix} \quad (7)$$

where $r_i$ corresponds to the coordinates for the points $P_i(x_i, y_i)$ located in the neighborhood $\Omega_0$ of the point $P_0(x_0, y_0)$ and $$I_x = \frac{\partial I}{\partial x}, I_y = \frac{\partial I}{\partial y} \text{ and } I_t = \frac{\partial I}{\partial t} \cdot V_n = \begin{bmatrix} v_{x,n} \\ v_{y,n} \end{bmatrix}$$

corresponds to the velocity field calculated on iteration n and $$\overline{V}_n = \begin{bmatrix} \overline{v}_{x,n} \\ \overline{v}_{y,n} \end{bmatrix}$$

corresponds to the average of the velocity field calculated on iteration n such as defined above for the regulation term.

Here, the equations defining the regularization term are:

$$\lambda \begin{bmatrix} 1 & 0 \\ 0 & 1 \end{bmatrix} \begin{bmatrix} v_{x,n+1} \\ v_{y,n+1} \end{bmatrix} = \lambda \begin{bmatrix} \overline{v}_{x,n} \\ \overline{v}_{y,n} \end{bmatrix}$$

Instead of regularization along $\vec{e}_x$ and $\vec{e}_y$, it may be advantageous to prefer regularization along the direction of the brightness vector gradient $$\vec{r} = \frac{\vec{\nabla}I}{\|\vec{\nabla}I\|}$$

and an orthogonal vector $\vec{s}$. In this case, the equations defining the regularization term can be written:

$$\begin{bmatrix} a\cos(\theta) & a\sin(\theta) \\ -b\sin(\theta) & b\cos(\theta) \end{bmatrix} \begin{bmatrix} v_{x,n+1} \\ v_{y,n+1} \end{bmatrix} = \begin{bmatrix} a(\cos(\theta)\overline{v}_{x,n} + \sin(\theta)\overline{v}_{y,n}) \\ b(-\sin(\theta)\overline{v}_{x,n} + \cos(\theta)\overline{v}_{y,n}) \end{bmatrix} \quad (8)$$

where $\theta = \arg(I_x + iI_y)$ and where the coefficients a and b are used to weight the regularization directions (for example it is possible to choose a<b).

It is furthermore possible to determine a weighted average of the vector gradient direction over the neighborhood $\Omega_0$; this amounts to finding the eigenvalues and eigenvectors of the matrix P.

The matrix from equation (7) can be inverted in order to solve it and get the velocity field for iteration n+1:

$$V_{n+1} = (\phi(V_n)^2 P + R)^{-1}(\phi(V_n)^2 Q + R\overline{V}_n) \text{ where} \quad (9)$$

$$V_n = \begin{bmatrix} v_{x,n} \\ v_{y,n} \end{bmatrix}, P = \begin{bmatrix} \sum W^2 I_x^2 & \sum W^2 I_x I_y \\ \sum W^2 I_x I_y & \sum W^2 I_y^2 \end{bmatrix} \text{ and}$$

$$Q = \begin{bmatrix} -\sum W^2 I_x I_t \\ -\sum W^2 I_y I_t \end{bmatrix}$$

and where R is found from the regularization equation (8), for example:

$$R = \begin{bmatrix} a^2\cos(\theta)^2 + b^2\sin(\theta)^2 & (a^2 - b^2)\cos(\theta)\sin(\theta) \\ (a^2 - b^2)\cos(\theta)\sin(\theta) & a^2\sin(\theta)^2 + b^2\cos(\theta)^2 \end{bmatrix} \quad (10)$$

The sums $\Sigma$ from the matrix P can be understood as being sums over the points $P_i(x_i, y_i)$ from the neighborhood $\Omega_0$ of the point $P_0(x_0, y_0)$, and the terms W and the spatial-temporal gradients of the brightness are taken near said points $P_i(x_i, y_i)$.

The terms W correspond to the window function $W_0(x, y)$ defined above, which is used for weighting over the set of point from the neighborhood $\Omega_0$ of the point $P_0(x_0, y_0)$.

Figure 2:
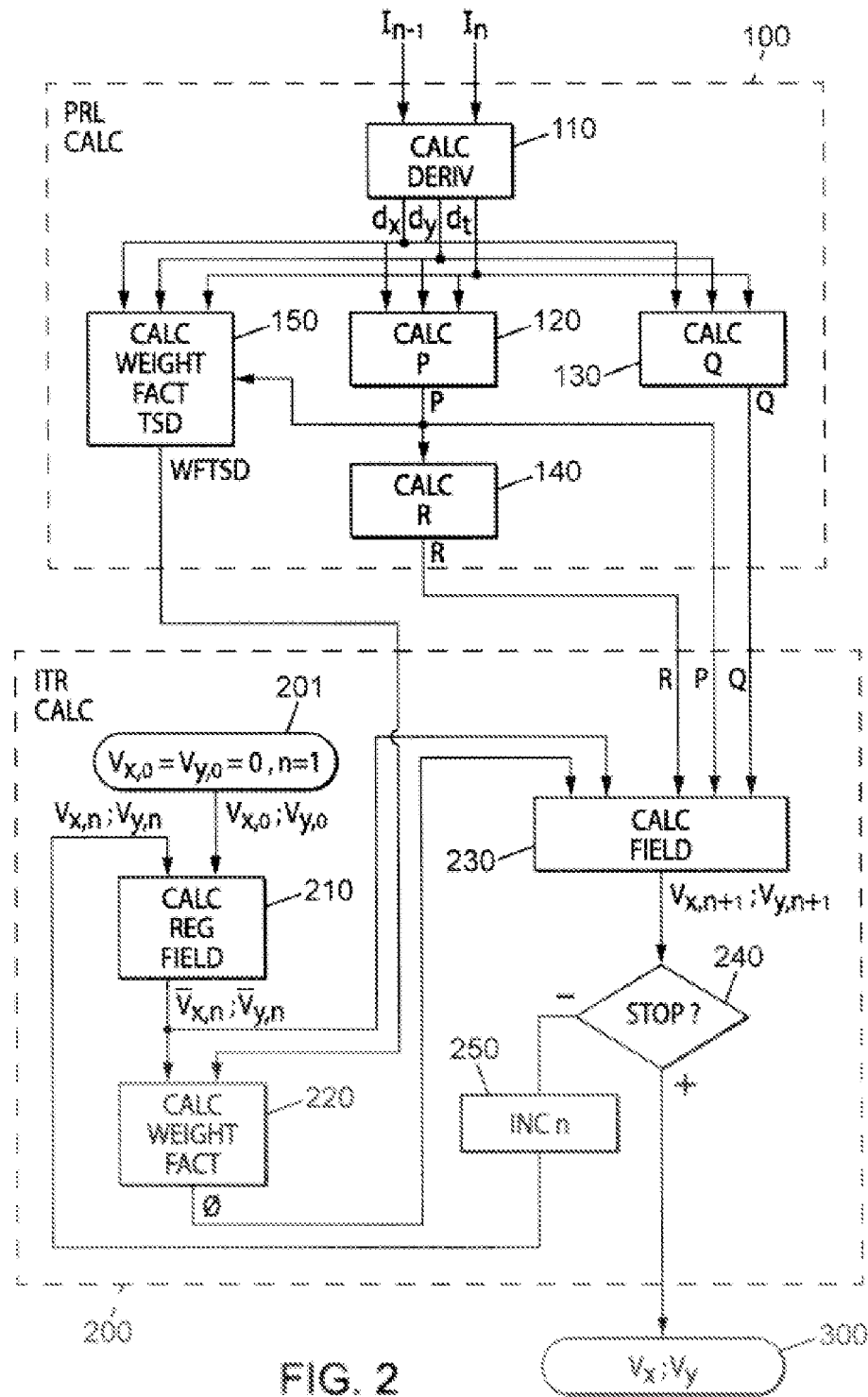
FIG. 2 shows an implementation of an estimation method according to an embodiment of the present invention.

With reference to FIG. 2, a motion estimation method according to an embodiment of the present invention includes two steps: one step for preliminary calculations 100 followed by a step of iterative calculation of the velocity field 200.

Here we consider a series of images $I_i$ for i an integer between 1 and N. This series of images includes at least one preceding image $I_{k-1}$ and one following image $I_k$.

The first step 100 consists of initializing the base terms.

It comprises a first operation 110 of calculating spatial-temporal derivatives of the brightness from the preceding $I_{k-1}$ and following $I_k$ images. This step thus consists of calculating the terms $$I_x = \frac{\partial I}{\partial x}, I_y = \frac{\partial I}{\partial y} \text{ and } I_t = \frac{\partial I}{\partial t}$$

at each point of the image. The points from the image could be chosen as corresponding to points from the preceding image, the following image or in a different reference frame from the two images. The time derivative $$I_t = \frac{\partial I}{\partial t}$$

is estimated by using information about the time interval between the two images.

A second operation 120 consists of determining the matrix $$P = \begin{bmatrix} \sum W^2 I_x^2 & \sum W^2 I_x I_y \\ \sum W^2 I_x I_y & \sum W^2 I_y^2 \end{bmatrix}$$

from the spatial-temporal derivatives and also the windowing function W defining the weighting of the points in the neighborhood $\Omega$ of each point considered $P_0(x_0, y_0)$ from the image.

During the third operation 130, the matrix $$Q = \begin{bmatrix} -\sum W^2 I_x I_t \\ -\sum W^2 I_y I_t \end{bmatrix}$$

is evaluated.

A fourth operation 140 is used to calculate the regulation matrix R, for example in the manner detailed above in equation (10).

Finally, a fifth operation 150 can comprise the determination of a weighting level for the homogeneous regions on the basis of the eigenvalues of the matrix P. The homogeneous regions correspond in fact to regions in which the eigenvalues of the matrix P are small values; a threshold weighting value for the eigenvalues of the matrix P can therefore be set in order to weight the homogeneous regions.

During a second step 200, the motion vectors are estimated at a plurality of points from an image selected among the preceding image $I_{k-1}$ and the following image $I_k$.

A set 201 of values for the velocity field $v_x$, $v_y$ at each point $P_0(x_0, y_0)$ of the image is first initialized. At iteration 0 these values correspond to the velocity field $V_0$.

The second step 200 next includes a first operation 210 consisting of determining the averages of the velocity field $$\overline{V}_n = \begin{bmatrix} \overline{v}_{x,n} \\ \overline{v}_{y,n} \end{bmatrix}$$

corresponding to the average of the velocity field over a neighborhood of the point $P_0(x_0, y_0)$, defined above for the regulation term.

A second operation 220 is going to consists of a calculation of the weighting terms $\phi(V_n)$; this calculation can use the average values the field determined during the first operation 210 detailed above.

Then, third operation 230 consists of solving the equation (10) using the matrices determined during the preliminary step 100 and the results of the first 210 and second 220 operations of the calculation step 200 which gives the new velocity field $V_{n+1}$ for the step n+1.

In a fourth step 240, the opportunity to stop the iterative calculation is evaluated against a predefined criterion. This criterion can constitute comparing the number of the current iteration n with a maximum number of iterations $n_{max}$, meaning testing the condition $n \leq n_{max}$.

In the case where the intended iteration number is reached, the iterative calculation step 200 ends and returns the last estimated velocity field $V_{n_{max}}$.

Otherwise, the iteration number counter n is incremented during a fifth step 250 and the estimated velocity field $V_n$ is used as an initial value for a new calculation from step 200. It is thus used as an initial value for a new operation 210 for determining averages of the velocity field. The following operations 220, 230 and 240 are then reiterated.

Another criterion for the fourth step 240 can include comparison of the deviation between the velocity field obtained at the end of the third step 230 $V_{n+1}$ and the velocity field resulting from the preceding iteration $V_n$. As a reminder one criterion can consist of evaluating the following condition $\|V_{n+1} - V_n\| \leq \epsilon$ where $\epsilon$ is a predefined value.

Figure 3:
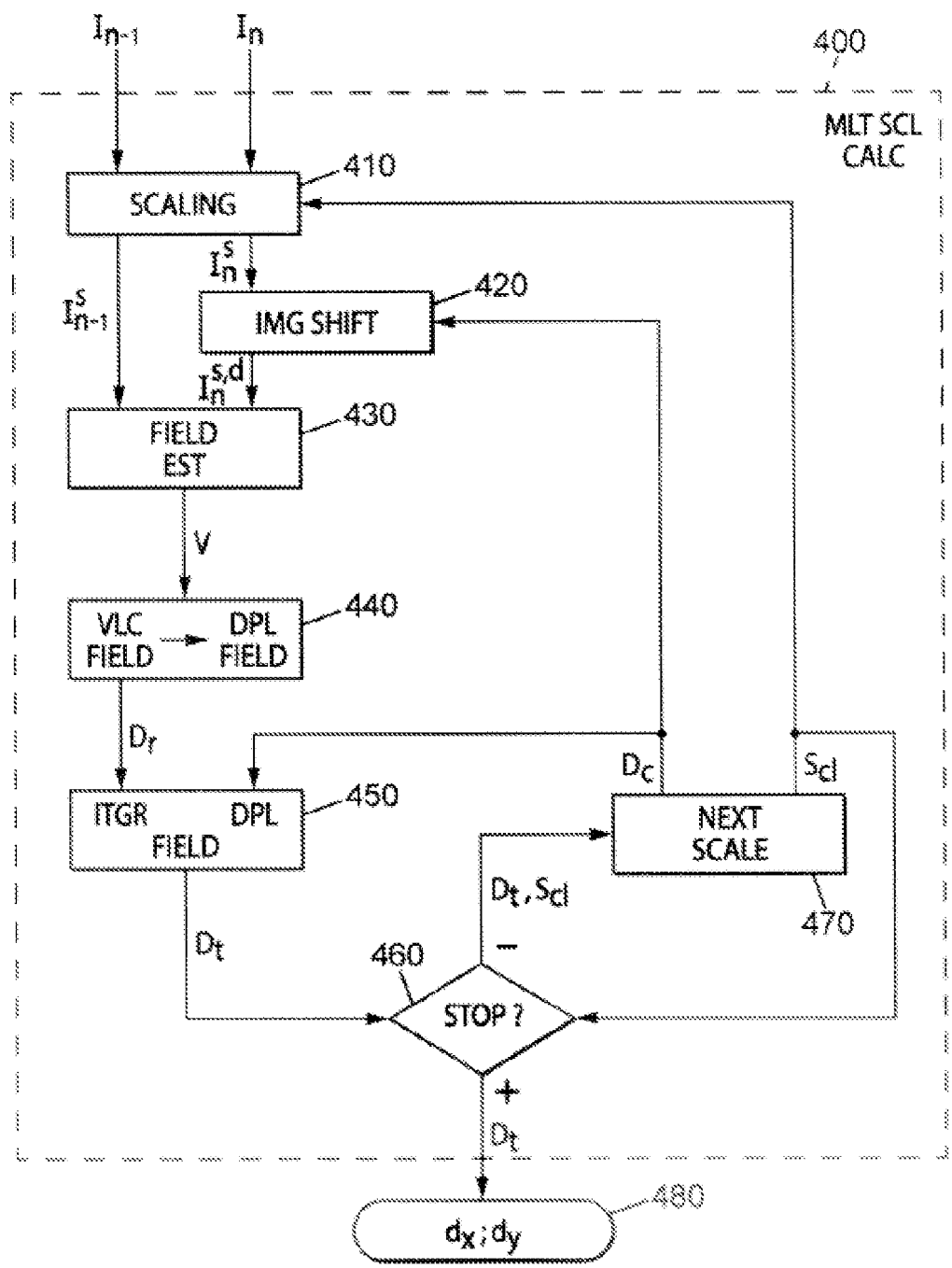
FIG. 3 shows another implementation of an estimation method according to an embodiment of the present invention.

Now with reference to FIG. 3, a multiscale motion estimation method 400 according to the present invention is now going to be described.

The expansion to the first-order (2) of the apparent motion constraint equation (1) detailed above is only valid for small motions, for example of order of a pixel. In order to measure large displacements, it is therefore advantageous to perform a multiscale calculation.

The multiscale motion estimation method 400 is applied to a series of images $I_i$ for i an integer between 1 and N, where this series of images includes at least one preceding image $I_{k-1}$ and one following image $I_k$.

During a first step 410, the preceding $I_{k-1}$ and following $I_k$ images are scaled in order to give images scaled to $I_{k-1}^s$ and $I_k^s$. This step can include application of an anti-aliasing filter and then decimation of the image.

An anti-aliasing filter consists of removing, before decimation, the frequencies greater than half of the decimation frequency. The images can also be pre-filtered in order to filter the high frequencies, for example using pyramidal filters.

During the second step 420 and in the case where a first iteration of the method 400 has already been done, one of the images, for example the scaled following image $I_n^s$ is repositioned as a function of the displacement field $D_c$ determined during the previous iteration in order to give the scaled and registered following image $I_n^{s,d}$.

In the case where the method is in the first iteration thereof, the displacement field $D_c$ and the scale Scl are initialized to zero.

A third step 430 includes execution of a motion estimation method according to an embodiment of the present invention including two steps: one step for preliminary calculations 100 followed by a step of iterative calculation of the velocity field 200, as described above with reference to FIG. 3. The preceding and following images, introduced on input into said method, correspond to the scaled preceding image $I_{k-1}^s$ and registered scaled following image $I_k^{s,d}$. This method serves to estimate a residual velocity field estimation V between the registered images at a given scale.

Then a fourth step 440 of conversion of the residual velocity field V into a residual displacement field is $D_r$ done. This step can for example include a temporal integration.

A fifth step 450 includes the vector summation with smoothing of the residual displacement field $D_r$ and the displacement field $D_c$ determined in the preceding iteration in order to give a total displacement field $D_t$ by means of the following formal equation:

$$D_t = D_r \Gamma D_c$$

The vector summation with smoothing can include several methods for regularization of the field before or after interpolation and summation. It is for example possible to apply a linear filter (for example a small-size pyramidal filter like the one from equation (11)), a nonlinear filter (like a weighted average of the points from the neighborhood), a median filtering or a variable capacity nonlinear diffusion. A variable capacity nonlinear diffusion is based on a partial differential equation similar to the equation for thermal diffusion:

$$\frac{\partial J}{\partial t} = \text{div}(c(\|\nabla J\|)\nabla J) \text{ with } J(x, y, t) = I(x, y)$$

The function c, called capacity, can for example have the form $c: x \mapsto 1/(1+(x/k)^2)$ where k is a filtering capacity, for example taken equal to 1 or dependent on the local noise level. The numeric solution of this equation can be done with the fixed step explicit Euler method where the calculation of the divergence term is done by a Perona-Malik numeric method.

During the sixth step 460, a selection criterion is applied in order to determine whether it is necessary to proceed with the new iteration at a different scale. This criterion can for example be a criterion that is a function of the total displacement field $D_t$ obtained or a criterion that is a function of the number or value of the scale Scl.

In the case where new iteration is done, a step 470 of changing scale can be done. This step can include an operation of shaping the displacement field $D_c$ for the following iteration using the total displacement field $D_t$. The step 470 can additionally comprise an operation to update the scale parameter Scl to the new value of the scale parameter.

An alternative embodiment of the multiscale motion estimation method 400 above may omit the second step 420 of registering. A field estimation such as that from the third step 430 is then done at each scale and the final displacement field will be composed from the fields estimated at each scale and considered to be reliable according to a conditioning criterion.

Such a conditioning criterion can for example be based on the eigenvalues of the matrix $M = \phi(V_n)^2 P + R$ detailed in equation (9) above. This matrix is a 2×2 real symmetric matrix and a good conditioning criterion can for example be a function of the ratio of the two eigenvalues of the matrix M, for example $$\frac{\lambda_+}{\lambda_-} \le 10.$$

Thus, for each point $P_0(x_0, y_0)$ from the image, the estimated motion field can have either a reliable value provided by an estimation at fine scale or a reliable value estimated at a coarser scale and multiplied and zoomed by the appropriate scale factor.

Once an estimation method is executed, it is possible to temporally filter the resulting displacement field, since the mobile objects usually move with small accelerations. For this purpose a third-order pyramidal filter can for example be used on registered or unregistered images. It is thus possible to use a causal predictive filtering, meaning anticipating the displacement field at a given instant based on previous estimates, for example by a constant displacement velocity for the mobile objects in the image. With causal predictive filtering, data can be estimated based on preceding data and a model that could be adjusted. Kalman filtering is a classical example and the person skilled in the art could use any variant of it known from the prior art.

Finally, it is also possible to use a data linkage term in the frequency and not the spatial domain. Such a method is similar to the Gabor method and uses Gabor filters known to the person skilled in the art.

The following is then the data linkage system:

$$\left[\eta(\text{reg}(v_{x,n}, v_{y,n})) \begin{bmatrix} I_x * G_1 & I_y * G_1 \\ \ldots & \ldots \\ I_x * G_n & I_y * G_n \end{bmatrix}\right] \begin{bmatrix} v_{x,n+1} \\ v_{y,n+1} \end{bmatrix} = \left[\eta(\text{reg}(v_{x,n}, v_{y,n})) \begin{bmatrix} -I_t * G_1 \\ \ldots \\ -I_t * G_n \end{bmatrix}\right]$$

where the $G_i$ are Gabor filters, for example, of the form:

$$G_i(x,y) = \Re\{TF^{-1}[\exp(-2\pi^2\sigma^2((x-f_0\cos(\theta_i))^2+(y-f_0\cos(\theta_i))^2))]\}$$

where the $\theta_i$ are orientations of the filters and are for example selected from 0° to 150° by 30° steps, $f_0$ is the central frequency of the filters and can for example be selected in the range $[0.25\ 0.4]f_{max}$ and $\sigma$ is the Gaussian width and can for example be selected equal to 1.

Figure 4:
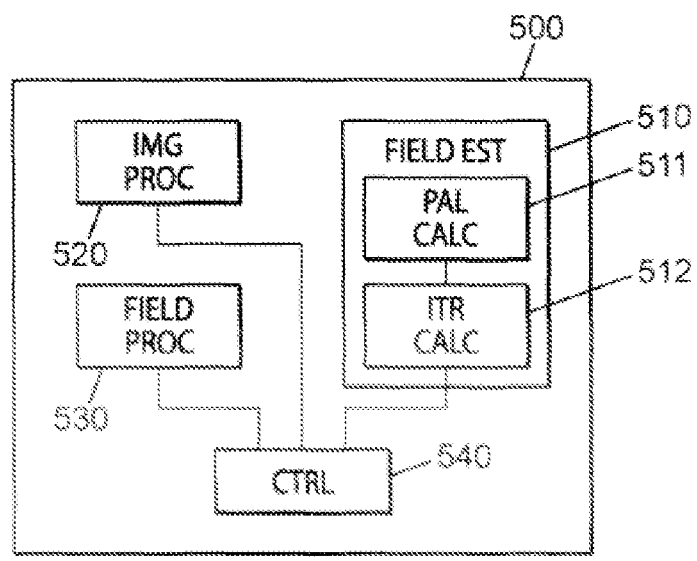
FIG. 4 shows a processing device comprising means suited for implementing a method according to an embodiment of the present invention.

FIG. 4 shows a system 500 for processing a series of images captured by an image sensor suited for implementing a method according to an embodiment of the present invention. Such a system 500 can advantageously correspond to an embedded electronic card.

Such a system 500 includes:
a first field estimation circuit 510 can for example include a preliminary calculation circuit 511 and an iterative calculation circuit 512.

These circuits 510, 511 and 512 can for example include microprocessors, programmable logic circuits such as FPGA and ASIC, Application-Specific Integrated Circuit, or integrated logic circuits of another type.

It can additionally include:
An image processing circuit 520, suited for performing image scaling or registration operations;
A circuit for processing fields 530 suited for performing operations on the velocity fields or displacement fields, for example the conversion of the velocity field into a motion field, vector summing with smoothing of displacement fields or changing to the following scale;
A control circuit 540 suited both for starting and controlling a sequence of steps from a method such as described above by commanding the field estimation 510, image processing 520 and field processing 530 circuits and also for deciding whether said method must be reiterated and for again starting the sequence if that is the case.

These circuits can for example include microprocessors, programmable logic circuits such as FPGA and ASIC, Application-Specific Integrated Circuit, or integrated logic circuits of another type.

If the sequence of steps is started and controlled again, the steps can be applied to the same preceding and following images.

In a variant, if the steps of a method such as described above are reiterated, then on each reiteration they are applied by considering as preceding image the following image from the preceding iteration and considering as following image an image which follows said following image from the preceding iteration.

Now with reference to FIGS. 5a, 5b, 5c and 5d, an estimation of motion in the series of images given by execution of a process according to the invention is illustrated.

Figure 5B:
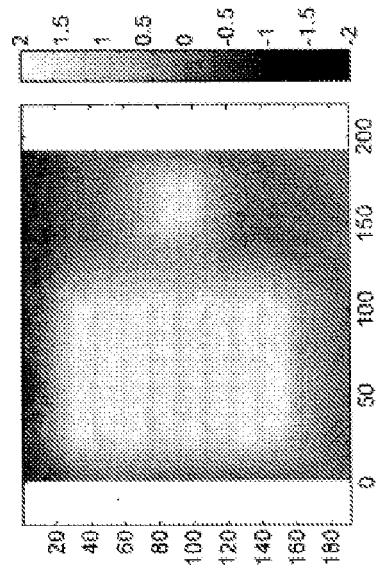
FIGS. 5a, 5b, 5c and 5d show respectively a first source image, a second source image, and estimation of the horizontal velocity field resulting from execution of a method according to embodiment of the present invention and an estimation of the vertical velocity field resulting from execution of a method according to an embodiment of the present invention.
Figure 5A:
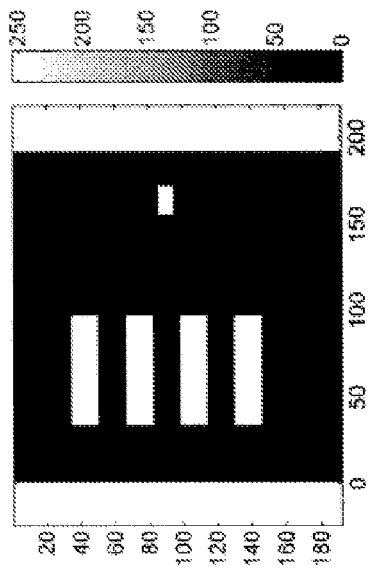

For illustration, FIG. 5a shows a first image source comprising a group of four white rectangles and also a small isolated rectangle to the right of the group.

FIG. 5b shows a second source image comprising the same group and isolated rectangle, where the group of four rectangles has moved relative to the first source image by one pixel towards the right of the image and two pixels towards the bottom of the image and the isolated rectangle has moved two pixels towards the bottom and two pixels towards the right of the image.

Figure 5D:
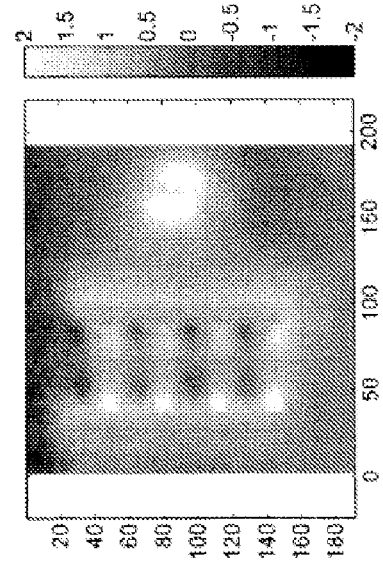
Figure 5C:
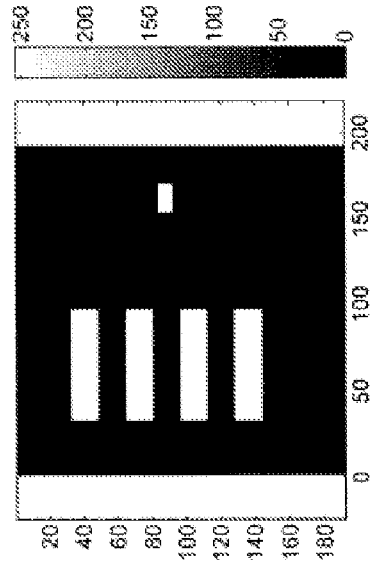

FIG. 5c shows an estimation of the horizontal velocity field resulting from the execution of a method according to an embodiment of the present invention.

In this figure, the horizontal component of the estimated motion vector is indicated at each of the points of the image by a grayscale brightness value varying between white (largest value of the horizontal component of the estimated motion vector at the image point considered) and black (smallest value of the horizontal component of the estimated motion vector at the image point considered).

Finally, FIG. 5d shows an estimation of the vertical velocity field resulting from the execution of a method according to an embodiment of the present invention.

In this figure, the vertical component of the estimated motion vector is indicated at each of the points of the image by a grayscale brightness value varying between white (largest value of the vertical component of the estimated motion vector at the image point considered) and black (smallest value of the vertical component of the estimated motion vector at the image point considered).

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for estimation of motion in a series of images captured by an image sensor where said series of images comprises at least one preceding image $I_{k-1}$ and one following image $I_k$ and the images comprise points with which are associated brightness data:
    where said method comprises estimating the estimated motion vectors,
    done at a plurality of image points chosen among the list made up by the previous image $I_{k-1}$ and the following image $I_k$;
    where for each of the points of said plurality of points of an image, an operation of minimization of a functional of motion vectors;
    where the functional comprises a sum of at least one data term and one regulation term;
    where the data term is a function of spatial-temporal gradients of brightness data associated with a plurality of points from a neighborhood of a point;
    where the regulation term has at least one finite value for each of the points of said plurality of points of an image in the area of which the minimization of the data term provides an irregular solution;
    said data term comprises a product of a weighting term and a data linkage term;
    where the weighting term is a function of the degree of regularity of the estimated motion vectors;
    where the data linkage term is a function of spatial-temporal gradients of brightness data associated with a plurality of points from a neighborhood of a point.

2. The method according to claim 1, wherein the minimization operation is reiterated at least once.

3. The method according to claim 1, wherein during an iteration n+1 of the minimization operation, the regulation term is a function of estimated motion vectors resulting from the preceding iteration n.

4. The method according to claim 2, wherein during an iteration n+1 of the minimization operation, the weighting term is a function of a local variance of estimated motion vectors resulting from the preceding iteration n.

5. The method according to claim 1, wherein the operation of minimization of the functional comprises a least-squares minimization.

6. The method according to claim 1 additionally comprising a step of scaling images from the image series, where said step of scaling is done prior to the step of estimated motion vector estimation.

7. The method according to claim 6, wherein the scaling step and the estimation step are iterated for at least two different image scales of the image series.

8. The method according to claim 7, additionally comprising a step of registering the following image $I_k$, done after the scaling step and before the minimization step, where the registration step comprises, for an iteration n+1 of said scaling steps, registration and estimation steps, the registering of the following image ($I_k$) over the base of estimated motion vectors resulting from the preceding iteration n.

9. The method according to claim 7, wherein the estimated motion vectors resulting from an iteration n+1 are stored if they satisfy an estimation reliability criterion and replaced by a function of the estimated motion vectors resulting from the preceding iteration if they do not satisfy said criterion n.

10. A system for processing a series of images captured by an image sensor, where said series of images comprises at least one preceding image $I_{k-1}$ and one following image $I_k$, where the images each comprise points with which are associated brightness data;

where the system comprises an estimation circuit suited for estimating the estimated motion vectors at a plurality of points from an image selected among the list made up by the preceding image $I_{k-1}$ and the following image $I_k$;

where said estimation comprises, for each of the points of said plurality of points of an image, an operation of minimization of a functional of motion vectors;

where the functional comprises a sum of at least one data term and one regulation term;

where the data term is a function of spatial-temporal gradients of brightness data associated with a plurality of points from a neighborhood of a point;

where the regulation term has at least one finite value for each of the points of said plurality of points of an image in the area of which the minimization of the data term provides an irregular solution;

where the data term comprises a product of a weighting term and a data linkage term, where the weighting term is a function of the degree of regularity of the estimated motion vectors;

where the data linkage term is a function of spatial-temporal gradients of brightness data associated with a plurality of points from a neighborhood of a point.

11. A non-transitory computer readable storage medium on which a computer program is stored, where the computer program comprises instructions suited for implementing a method according to claim 1, during execution of this computer program by circuit from a system for processing a series of images captured by an image sensor.

* * * * *